United States Patent
Lee

(10) Patent No.: US 11,143,531 B2
(45) Date of Patent: Oct. 12, 2021

(54) SENSOR POSITION CONTROL APPARATUS AND METHOD

(71) Applicants: Hyundai Motor Company, Seoul (KR); Kia Motors Corporation, Seoul (KR)

(72) Inventor: Jaehyun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 327 days.

(21) Appl. No.: 15/834,409

(22) Filed: Dec. 7, 2017

(65) Prior Publication Data

US 2018/0100750 A1    Apr. 12, 2018

Related U.S. Application Data

(62) Division of application No. 14/095,534, filed on Dec. 3, 2013, now Pat. No. 9,863,793.

(30) Foreign Application Priority Data

Dec. 14, 2012 (KR) .................. 10-2012-0146796

(51) Int. Cl.
*G01D 11/30* (2006.01)
*G01D 18/00* (2006.01)
*G01D 1/00* (2006.01)

(52) U.S. Cl.
CPC ............ *G01D 11/30* (2013.01); *G01D 1/00* (2013.01)

(58) Field of Classification Search
CPC ................ G01D 11/30; G01D 18/00
USPC .................. 73/1.75, 1.79, 1.8
See application file for complete search history.

(56) References Cited

U.S. PATENT DOCUMENTS

| 5,033,386 | A | 7/1991 | Vatsvog |
| 5,189,805 | A | 3/1993 | Matsumoto et al. |
| 6,519,860 | B1* | 2/2003 | Bieg .......... B23H 7/26 33/1 PT |
| 7,100,297 | B2 | 9/2006 | McMurtry et al. |
| 10,288,170 | B2* | 5/2019 | Karlsson ......... B60W 30/18054 |

(Continued)

FOREIGN PATENT DOCUMENTS

| JP | 06-210585 | 8/1994 |
| JP | 2009-166943 A | 7/2009 |

(Continued)

*Primary Examiner* — Nimeshkumar D Patel
*Assistant Examiner* — Nashmiya S Fayyaz
(74) *Attorney, Agent, or Firm* — Mintz Levin Cohn Ferris Glovsky and Popeo, P.C.; Peter F. Corless

(57) ABSTRACT

A sensor position control apparatus and method that includes a guide rail formed to be elongated along one direction set to a longitudinal direction thereof and a position control unit coupled to the guide rail and configured to slide along the longitudinal direction of the guide rail. A sensor mount unit is connected to be moved together with the position control unit and has a sensor mounted on one surface thereof. In addition, an angle control unit is configured to change a direction which one surface of the sensor mounting unit faces and a position control driving unit is configured to transmit power to the position control unit. An angle control driving unit is configured to transmit power to the angle control unit.

5 Claims, 9 Drawing Sheets

(56) References Cited

U.S. PATENT DOCUMENTS

| | | | |
|---|---|---|---|
| 2004/0083018 A1* | 4/2004 | Dollevoet | A61F 13/15772 |
| | | | 700/109 |
| 2008/0319570 A1* | 12/2008 | Van Schoiack | B23P 19/06 |
| | | | 700/110 |
| 2009/0078742 A1 | 3/2009 | Pasquali et al. | |
| 2011/0093110 A1* | 4/2011 | Stencel | B25B 21/00 |
| | | | 700/110 |
| 2011/0210240 A1 | 9/2011 | Hidalgo et al. | |
| 2013/0167389 A1* | 7/2013 | Christoph | G01B 21/045 |
| | | | 33/503 |
| 2017/0164947 A1* | 6/2017 | Williams | A61B 17/1155 |
| 2018/0283839 A1* | 10/2018 | Rugged | G01B 3/24 |

FOREIGN PATENT DOCUMENTS

| | | |
|---|---|---|
| KR | 1020070064730 | 6/2007 |
| KR | 1020120055044 | 5/2012 |

* cited by examiner

SENSOR POSITION CONTROL APPARATUS AND METHOD

CROSS-REFERENCE TO RELATED APPLICATION

This Application is a Divisional Application of U.S. patent application Ser. No. 14/095,534 filed on Dec. 3, 2013 which claims priority to and the benefit of Korean Patent Application No. 10-2012-0146796 filed in the Korean Intellectual Property Office on Dec. 14, 2012, the entire contents of which are incorporated herein by reference.

BACKGROUND

(a) Field of the Invention

The present invention relates to a sensor position control apparatus and method, and more particularly, to a sensor position control apparatus and method which facilitates setting a sensor used for quality inspection of a vehicle.

(b) Description of the Related Art

In general, a production process for a vehicle includes a process of assembling various parts. Furthermore, a plurality of coupling members such as bolts are bolted during the part assembling process.

A bolting defect of the coupling member may have an effect on the quality of the vehicle. Furthermore, as the safety of the vehicle is degraded, an accident may occur. Therefore, a bolting check to detect a bolting defect is thoroughly performed during the production process of the vehicle. The bolting check may be performed using a plurality of sensors installed along a production line trace bolting positions. Furthermore, the completeness of the bolting check may be sensitively changed depending on the installation positions of the sensors. Therefore, the optimal positions of the sensors are selected through repetitive tests.

However, whenever the positions of the sensors are changed during the repetitive tests, an inconvenient sensor resetting process is required. Furthermore, when a problem occurs during the operation of the production line and sensor resetting is required, the operation of the production line is stopped until the sensor resetting is completed. Furthermore, experts are required for sensor resetting, and thus, the operation of the production line may be stopped for a long time.

The above information disclosed in this section is only for enhancement of understanding of the background of the invention and therefore it may contain information that does not form the prior art that is already known in this country to a person of ordinary skill in the art.

SUMMARY

The present invention provides a sensor position control apparatus and method which is capable of facilitating sensor setting. In addition, the present invention provides a sensor position control apparatus and method which is capable of preventing operation of a production line from being stopped.

An exemplary embodiment of the present invention provides a sensor position control apparatus including: a guide rail formed to be elongated along one direction set to a longitudinal direction thereof; a position control unit coupled to the guide rail and configured to slide along the longitudinal direction of the guide rail; a sensor mount unit connected to be moved together with the position control unit and including a sensor mounted on one surface thereof; an angle control unit configured to change a direction which one surface of the sensor mounting unit having the sensor mounted thereon faces; a position control driving unit configured to transmit power to the position control unit; and an angle control driving unit configured to transmit power to the angle control unit.

The sensor mounting unit may include: a ball formed in a spherical shape; a sensor mounting plate formed at one end of the ball and having a plate shape including one surface on which the sensor is mounted; and a protrusion that protrudes from the ball. The protrusion may be formed in the opposite direction of the sensor mounting plate. The sensor position control apparatus may further include a ball housing unit disposed over the position control unit and formed to house the ball. The ball may be inserted into the ball housing unit to be rolled, and the angle control unit may move the protrusion to roll the ball inside the ball housing unit.

Another exemplary embodiment of the present invention provides a sensor position control apparatus including: a guide rail formed to be elongated along one direction set to a longitudinal direction thereof; a position control unit coupled to the guide rail and disposed to slide along the longitudinal direction of the guide rail; a sensor mounting unit connected to be moved together with the position control unit, and having a sensor mounted on one surface thereof; and a position control driving unit configured to transmit power to the position control unit.

Yet another exemplary embodiment of the present invention provides a sensor position control apparatus including: a sensor mounting unit having a sensor formed on one surface thereof; an angle control unit configured to change a direction which one surface of the sensor mounting unit having the sensor mounted thereon faces; an angle control driving unit configured to transmit power to the angle control unit; and a body unit having the sensor mounting unit, the angle control unit, and the driving unit disposed therein.

The sensor mounting unit may include: a ball formed in a spherical shape; a sensor mounting plate formed at one end of the ball and having a plate shape including one surface on which the sensor is mounted; and a protrusion that protrudes from the ball. The protrusion may be formed in the opposite direction of the sensor mounting plate. The sensor position control apparatus may further include a ball housing unit disposed in the body unit and formed to house the ball. The ball may be inserted into the ball housing unit to be rolled, and the angle control unit may move the protrusion to roll the ball inside the ball housing unit.

Still another exemplary embodiment of the present invention provides a sensor position control method that controls the position and angle of a sensor used for bolting check of a vehicle, including: measuring bolting position recognition performance of the sensor; calculating a target position of the sensor; correcting the position of the sensor; and comparing the measured bolting position recognition performance to reference performance.

Furthermore, a sensor position control apparatus that automatically corrects the position of the sensor may be used. The measuring of the bolting position recognition performance of the sensor may be performed before and after the correcting of the position of the sensor.

According to a request of an operator in a production line of a vehicle, the above-described steps may be performed from the measuring of the bolting position recognition performance of the sensor. The target position of the sensor may be calculated using data stored in a database and the reference performance of the sensor may be acquired by data stored in a database. When the measured bolting position recognition performance of the sensor does not satisfy the reference performance, the calculating of the target position of the sensor may be performed again. When the measured bolting position recognition performance of the sensor satisfies the reference performance, the process may end.

Figure 1:
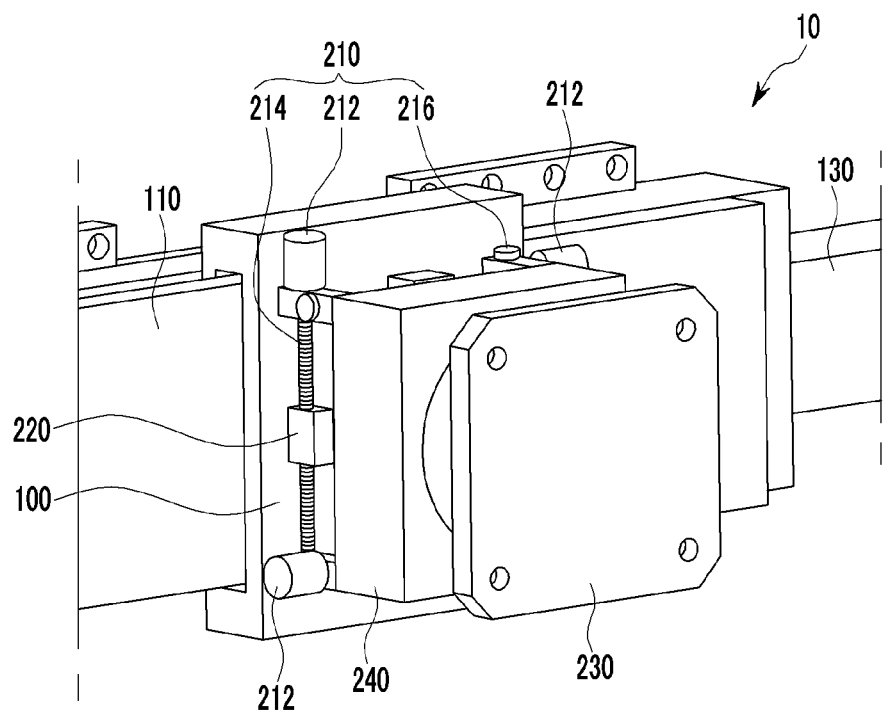
FIG. 1 is an exemplary view of a sensor position control apparatus according to an exemplary embodiment of the present invention.

| Description of symbols | |
|---|---|
| 10: Sensor position control apparatus | |
| 20: Sensor | 100: Position control unit |
| 102: Pillar | 104: Groove |
| 106: Penetration aperture | 110: Guide rail |
| 130: Position control driving unit | |
| 200: Angle control unit | 202: Operating unit |
| 204: Angle control bar | 206: Spiral aperture |
| 210: Angle control driving unit | 212: Motor |
| 214: Guide bar | 216: Locking portion |
| 230: Sensor mounting unit | 232: Sensor mounting plate |
| 234: Ball | 236: Protrusion |
| 240: Ball housing unit | 242: Housing depression |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 2:
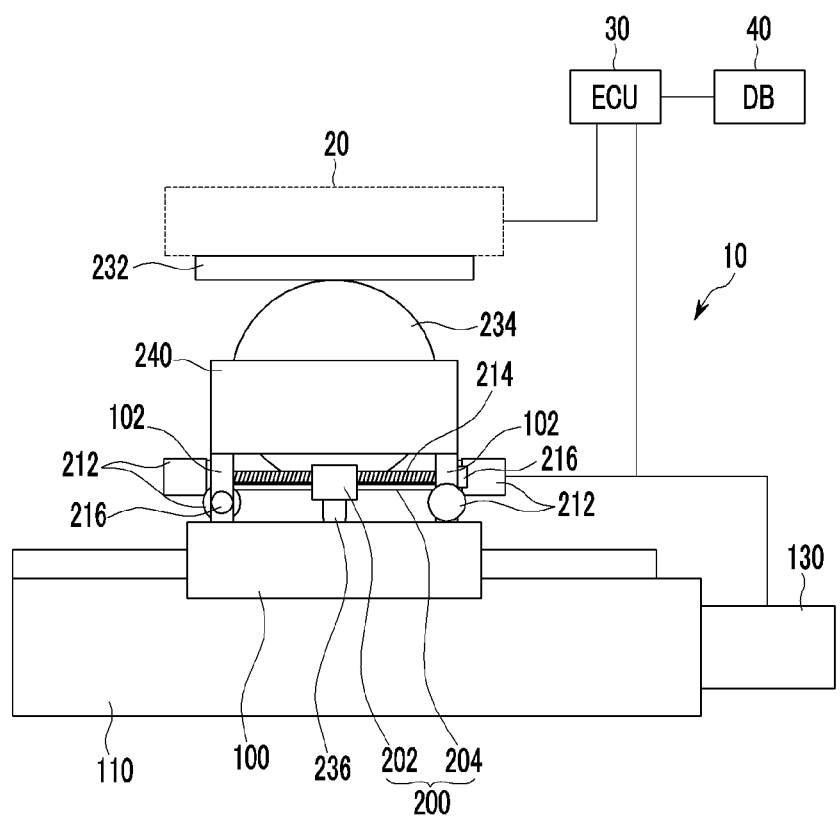
FIG. 2 is an exemplary front view of the sensor position control apparatus according to the exemplary embodiment of the present invention.

FIG. 1 is an exemplary view of a sensor position control apparatus according to an exemplary embodiment of the present invention. FIG. 2 is an exemplary front view of the sensor position control apparatus according to the exemplary embodiment of the present invention.

As illustrated in FIGS. 1 and 2, the sensor position control apparatus 10 according to the exemplary embodiment of the present invention may include a guide rail 110, a position control unit 100, a position control driving unit 130, a sensor mounting unit 230, a ball housing unit 240, an angle control unit 200, and an angle control driving unit 210.

The guide rail 110 may be formed in a three-dimensional shape with length, width, and thickness. Furthermore, the guide rail 110 may be formed to be elongated along one direction. The one direction corresponds to the longitudinal direction of the guide rail 110. In addition, the position control unit 100 may be coupled to the guide rail 110 to slide along the longitudinal direction of the guide rail 110. Furthermore, the position control unit 100 may be disposed on one surface of the guide rail 110.

The position control driving unit 130 may be configured to provide power to move the position control unit 100 along the longitudinal direction of the guide rail 110. In other words, the position control driving unit 130 may include an electric motor configured to convert electric energy into mechanical energy. Meanwhile, the electric motor may be substituted with another device to generate mechanical energy. The connection between the position control unit 100 and the electric motor disposed within the position control driving unit 130 to generate mechanical energy may be implemented in various manners by those skilled in the art.

A sensor 20 may be mounted within the sensor mounting unit 230. Furthermore, the sensor mounting unit 230 may be connected to the position control unit 100, and moved together with the position control unit 100 while the position control unit 100 slides. The sensor 20 may include a sensor used for vehicle quality inspection. In particular, the sensor may be used for a bolting test of the vehicle. Furthermore, the sensor 20 may be configured to sense a bolting position.

Figure 4:
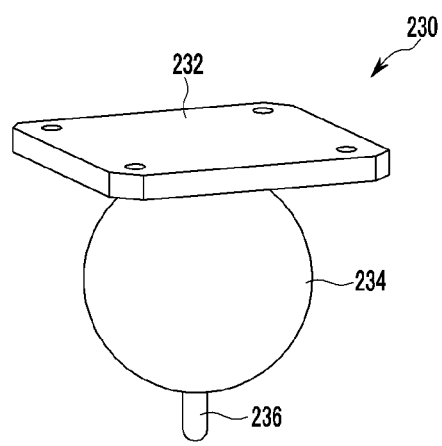
FIG. 4 is an exemplary view of a sensor mounting unit according to the exemplary embodiment of the present invention.

Referring to FIG. 4, the shape of the sensor mounting unit 230 will be described as follows. FIG. 4 is an exemplary view of the sensor mounting unit according to the exemplary embodiment of the present invention.

The sensor mounting unit 230 may include a ball 234, a sensor mounting plate 232, and a protrusion 236. The ball 234 may be formed in a spherical shape and the sensor mounting plate 232 may be formed at one end of the ball 234. Furthermore, the sensor mounting plate 232 may be formed in a plate shape and the sensor 20 may be mounted on one surface of the sensor mounting plate 232 formed in a plate shape. The protrusion 236 may be formed at the other end of the ball 234. Additionally, the protrusion 236 may be formed in a shape to protrude from the ball 234. In other words, the protrusion 236 may be formed in the opposite direction of the sensor mounting plate 232. The ball housing unit 240 may be mounted over the position control unit 100. Furthermore, the ball housing unit 240 may be coupled to pillars 102 formed on the position control unit 100.

Figure 5:
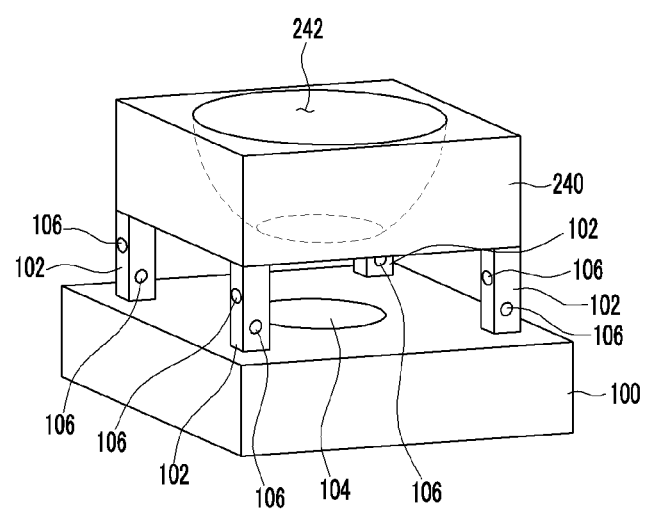
FIG. 5 is an exemplary view of a ball housing unit and a position control unit according to the exemplary embodiment of the present invention.

Referring to FIG. 5, the shapes of the ball housing unit 240 and the position control unit 100 will be described as follows. FIG. 5 is an exemplary view of the ball housing unit and the position control unit according to the exemplary embodiment of the present invention.

The ball housing unit 240 may be formed in a three dimensional shape with length, width, and thickness. The ball housing unit 240 may include a ball housing depression 242.

The ball housing depression 242 may be formed to house the ball 234. In other words, the ball 234 may be inserted into the ball housing depression 242. The ball housing depression 242 may be formed into the ball housing unit 240, and the ball 234 may be partially exposed to both sides of the ball housing unit 240 into which the ball housing depression 242 is formed. That is, the thickness of the ball housing unit 240 may be less than the diameter of the ball 234. Furthermore, the ball housing depression 242 may be formed in a shape that corresponds to the ball 234. Therefore, circular openings may be formed on both side surfaces of the ball housing unit 240, to which the ball 234 may be exposed. Furthermore, the circles of both openings may have a smaller diameter than the ball 234 such that the ball 234 may be prevented from falling out of from the ball housing depression 242. Meanwhile, the insertion of the ball 234 may be performed in such a manner that the ball 234 may be received in the ball housing depression 242 by elastic deformation of the ball housing unit 240.

The position control unit 100 may include a groove 104 and the pillars 102. The groove 104 may be formed to provide a space in which the protrusion 236 of the sensor mounting unit 230 may be disposed. In other words, a space for disposition and movement of the protrusion 236 may be secured by the groove 104. Furthermore, as the groove 104 is formed, design flexibility for the length of the protrusion 236 may be improved.

The plurality of pillars 102 may be formed to protrude from one surface of the position control unit 100. FIG. 5 illustrates that four pillars 102 protrude from one surface of the position control unit 100. Furthermore, each of the pillars 102 may have two or more penetration apertures 106 formed therethrough. FIG. 5 illustrates that one pillar 102 may have two penetration apertures 106 formed therethrough. Furthermore, two penetration apertures 106 formed in one pillar 102 may be formed at skew positions. In other words, two penetration apertures 106 formed in one pillar 102 may be positioned at different layers. Meanwhile, the penetration apertures 106 formed at the same layers of adjacent pillars may pass through the pillars in the same direction.

The angle control unit 200 may be configured to control the movement of the protrusion 236 to change a direction which one surface of the sensor mounting plate 232 having the sensor 20 mounted thereon faces. The ball 234 may be rolled when the ball 234 is received into the ball housing depression 242. Furthermore, as the protrusion 236 is moved by the angle control unit 200, the ball 234 may be rolled. The angle control driving unit 210 may be configured to provide power to allow the angle control unit 200 to control the motion of the protrusion 236. Furthermore, the angle control driving unit 210 may include a motor 212, a guide bar 214, and a locking portion 216. The motor 212 may be an electric motor to convert electric energy into mechanical energy.

The guide bar 214 may be formed in a cylindrical shape of which the length is larger than the width. Furthermore, the guide bar 214 may have one end connected to the motor 212 to be rotated in a circumferential direction by the motor 212. Furthermore, the guide bar 214 may have spirals formed on an outer circumference thereof. Furthermore, the guide bar 214 may be coupled to the pillars 102 of the position control unit 100. In addition, the guide bar 214 may be coupled to the pillars 102 to allow parts of the guide bar 214 to be inserted into the penetration aperture 106 of one pillar 102 and the penetration aperture 106 of another adjacent pillar 102, which may be formed at the same layer, respectively. Four guide bars 214 may be coupled to four pillars in the above-described manner Meanwhile, the part of the outer circumference of the guide bar 214, which is inserted into the pillar 102, may have no spirals.

The locking portion 216 may be disposed at the other end of the guide bar 214. Furthermore, the locking portion 216 may be formed to prevent the other end of the guide bar 214 from separating from the pillar. In other words, the motor 212 and the locking portion 216 may be disposed at both ends of the guide bar 214, and the two adjacent pillars 102 may be disposed between the motor 212 and the locking portion 216. As the locking portion 216 and the motor 212 are locked to the two adjacent pillars 102 exterior to the pillars 102, the guide bar 214 may be prevented from separating from the pillars.

Figure 3:
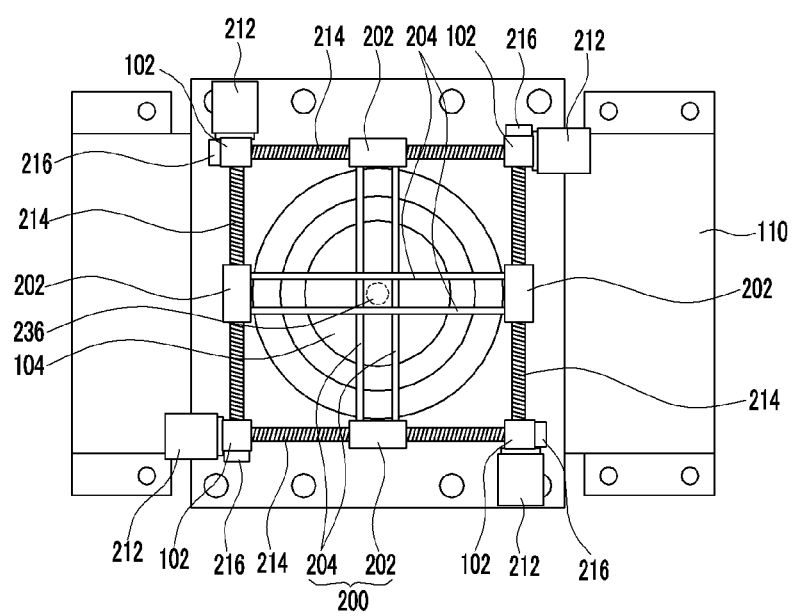
FIG. 3 is an exemplary plan view of the sensor position control apparatus according to the exemplary embodiment of the present invention.

FIG. 3 is an exemplary plan view of the sensor position control apparatus according to the exemplary embodiment of the present invention. In FIG. 3, the sensor mounting unit 230 and the ball housing unit 240 are omitted. However, the position of the protrusion 236 is indicated by a dotted line. Furthermore, FIG. 3 illustrates that four guide bars 214 are coupled to four pillars in the above-described manner. As illustrated in FIG. 3, the two angle control units 210 may be provided for the four angle control driving unit 210. Furthermore, the angle control unit 200 may move along the longitudinal direction of the guide bar 214.

Figure 6:
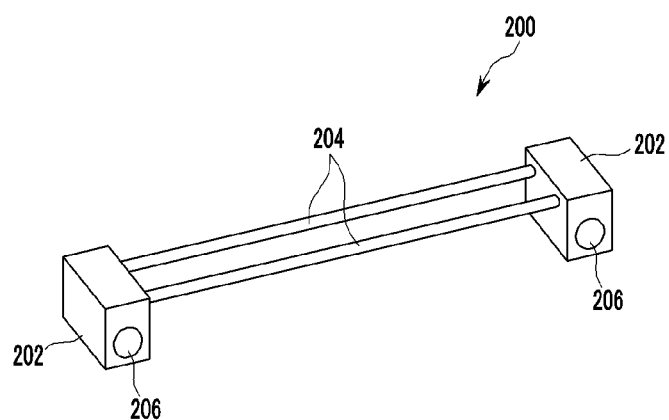
FIG. 6 is an exemplary view of an angle control unit according to the exemplary embodiment of the present invention.

Referring to FIG. 6, the shape and operation of the angle control unit 200 will be described as follows. FIG. 6 is an exemplary view of the angle control unit according to the exemplary embodiment of the present invention.

The angle control unit 200 may include an angle control bar 204, an operating unit 202, and a spiral aperture 206. The angle control bar 204 may include two parallel bars. Furthermore, the two angle control bars 204 may be disposed to be spaced at a preset distance from each other. That is, the one angle control unit 200 may include two angle control bars 204.

The operating unit 202 may be formed at both ends of the two angle control bars 204. In other words, the one angle control unit 200 may include the two operating units 202. Furthermore, the two angle control bars 204 may be disposed between the two operating units 202, and may be formed to connect the two operating units 202. The spiral aperture 206 may be formed through the operating unit 202. Furthermore, the spiral aperture 206 may be formed in a vertical direction with respect to the two parallel angle control bars 204. Furthermore, the spiral aperture 206 may have spirals formed on an inner circumference thereof, the spirals may correspond to the spirals formed on the outer circumference of the guide bar 214.

As the guide bar 214 is inserted through the spiral aperture 206, the angle control driving unit 210 and the angle control unit 200 may be coupled to each other. Therefore, the one angle control unit 200 may be coupled to two angle control driving units 210. In other words, the one angle control unit 200 and the two angle control driving units 210 may form one set. Furthermore, the operating unit 202 may be disposed between the two adjacent pillars 102. As the guide bar 214 is rotated by the operation of the motor 212, the angle control unit 200 may be moved along the longitudinal direction of the guide bar 214 by the spirals formed in the spiral aperture 206. Furthermore, two motors included in one set may be operated to keep a balance therebetween.

FIG. 3 illustrates two sets each including one angle control unit 200 and two angle control driving units 210. The angle control bars 204 of one set cross the angle control bars 204 of another set at right angles. At this time, as two parallel angle control bars 204 of one set cross two parallel angle control bars 204 of another set, a rectangular frame may be formed in the center. The protrusion 236 may be disposed inside the rectangular frame. Therefore, when the position of the rectangular frame changes, the protrusion 236 may be moved together with the rectangular frame.

Figure 7:
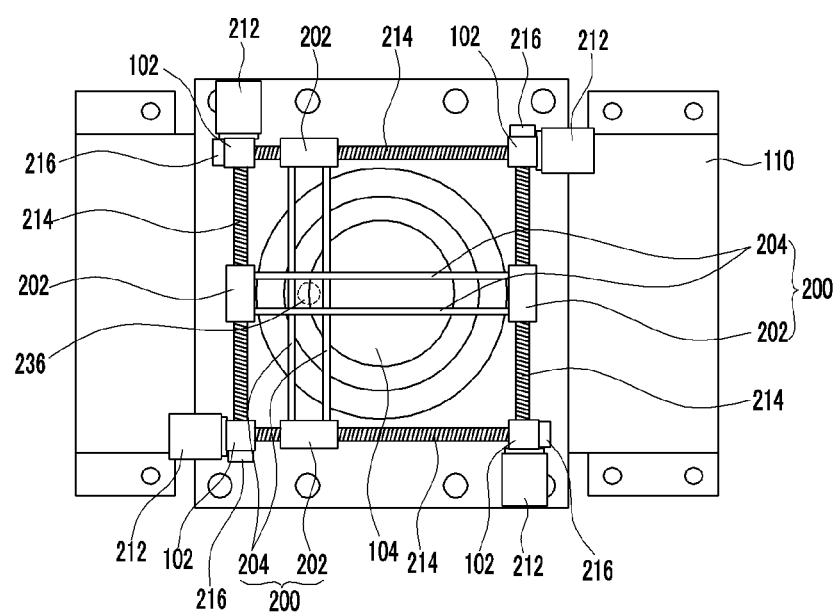
FIGS. 7 and 8 are exemplary diagrams illustrating an angle control operation of the sensor position control apparatus according to the exemplary embodiment of the present invention.
Figure 8:
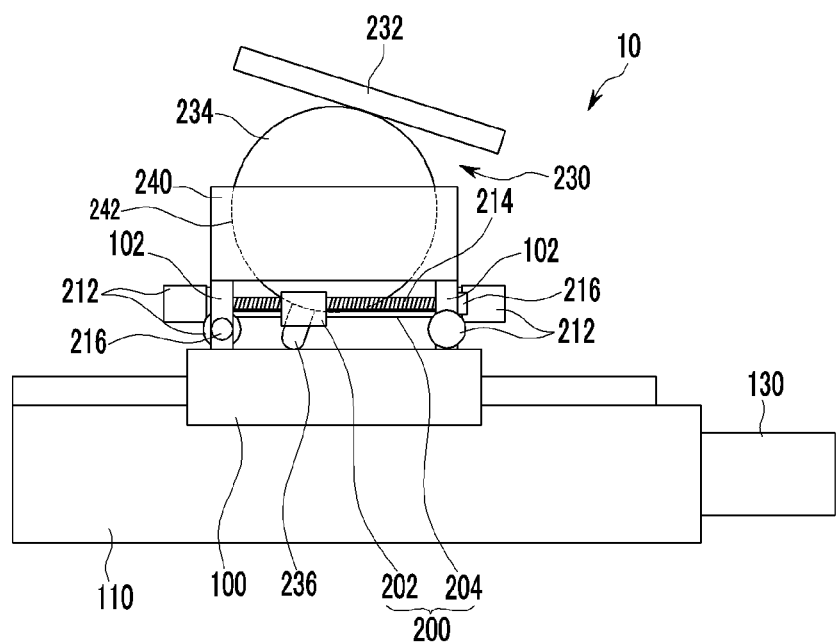

FIGS. 7 and 8 are exemplary diagrams illustrating the angle control operation of the sensor position control apparatus according to the exemplary embodiment of the present invention. FIG. 7 illustrates a state in which the angle control is performed in the plan view of FIG. 3. FIG. 8 illustrates a state in which the angle control is performed in the front view of FIG. 2.

As illustrated in FIGS. 7 and 8, when the motor 212 is operated, the operating unit 202 may be moved along the longitudinal direction of the guide bar 214. Then, the angle control unit 200 may be moved, and the angle control bar 204 may move the protrusion 236.

FIG. 7 illustrates that one of two operating units 202 included in one set may be moved in a direction away from the motor 212, and the other may be moved in a direction near to the motor 212. However, the two motors 212 included in the one set may be disposed in the same direction, and the two operating units 202 may be operated to be remote from the two motors 212 or formed near to the two motors 212 at the same time. The arrangement of the angle control driving unit 210 and the angle control unit 200 may be changed depending on design of those skilled in the art.

When the protrusion 236 is moved, the ball 234 is rolled inside the housing depression 242. Then, the direction which one surface of the sensor mounting plate 232 having the sensor 20 mounted thereon faces is changed.

FIGS. 7 and 8 illustrate the operation of one set including the angle control driving units 210 and the angle control unit 200. However, another set may be operated in the same manner. Furthermore, two sets may be simultaneously operated. Therefore, the angle of the sensor 20 may be controlled in various manners.

Meanwhile, as the four guide bars 214 may be connected to the eight penetration holes 106 formed at skew positions in the above-described manner, one set of the angle control driving units 210 and the angle control unit 200 may be operated without interference with another set.

Figure 9:
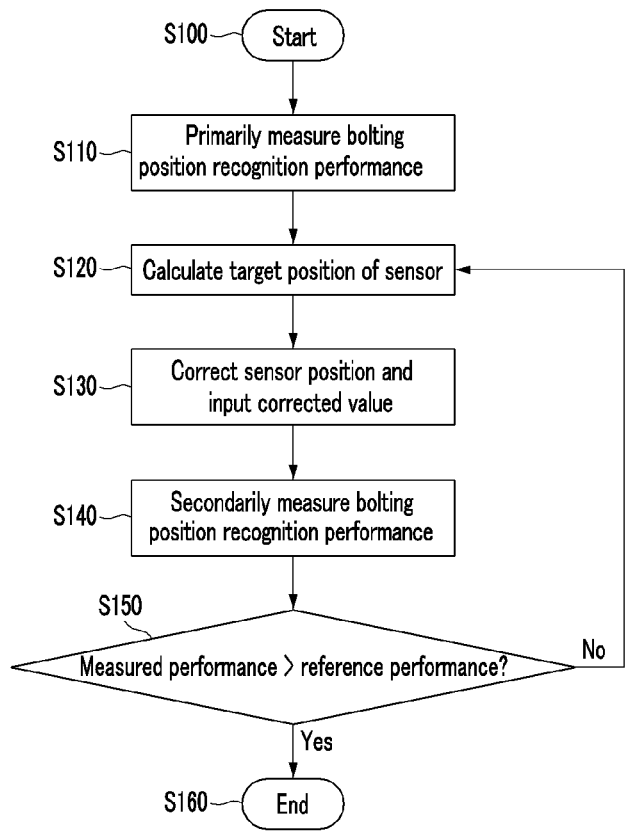
FIG. 9 is an exemplary flowchart of a sensor position control method according to the exemplary embodiment of the present invention.

FIG. 9 is an exemplary flowchart of a sensor position control method according to the exemplary embodiment of the present invention.

FIG. 2 illustrates that an electronic control unit 30 may be connected to the sensor 20, the position control driving unit 130, and the angle control driving unit 210 and a database 40 may be connected to the electronic control unit 30. In particular, the electronic control unit 30 may include a typical electronic control unit (ECU) configured to operate the electronic devices. Since general functions of the electronic control unit 30 and the database 40 are obvious to those skilled in the art, the detailed descriptions thereof are omitted herein.

The electronic control unit 30 and the database 40 may be disposed in a production line of vehicles, and the database 40 may be embedded in the electronic control unit 30. Furthermore, the electronic control unit 30 may be configured to receive data of the database 40 and state information of the sensor 20 from the database 40 and the sensor 20, and operate the position control driving unit 130 and the angle control driving unit 210.

As illustrated in FIG. 9, when sensor position control is started (S100), the electronic control unit 30 may be configured to primarily measure performance of the sensor 20 to recognize a bolting position (S110). The sensor position control may be started according to a request of an operator, when the sensor 20 is initially set in a production line of a vehicle where quality inspection including a bolting check of the vehicle is performed and when the sensor 20 is required to be reset during the operation of the production line of the vehicle. Furthermore, the performance of the sensor 20 to recognize a bolting position may be measured by repetitive operations, based on data previously input to the database 40.

When the performance of the sensor 20 to recognize a bolting position is measured (S110), the electronic control unit 30 may be configured to calculate a target position of the sensor 20 (S120). The target position of the sensor 20 may be calculated by the data stored in the database 40. When the target position of the sensor 20 is calculated (S120), the electronic control unit 30 may be configured to correct the position of the sensor 20 (S130). The position correction of the sensor 20 may be performed by the operation of the sensor position control apparatus 10, as the electronic control unit 30 operates the position control driving unit 130 and the angle control driving unit 210. Furthermore, the corrected position value may be stored in the database 40 at the same time when the position of the sensor 20 is corrected (S130).

When the position correction of the sensor 20 is completed, the electronic control unit 30 may be configured to secondarily measure the performance of the sensor 20 to recognize a bolting position (S140). When the secondary measurement S140 is completed, the electronic control unit 30 may be configured to determine whether the measured performance of the sensor 20 satisfies reference performance (S150). The reference performance of the sensor 20 may be acquired by the data stored in the database 40.

When the performance of the sensor 20 does not satisfy the reference performance, the procedure returns to the step S120. When the performance of the sensor 20 satisfies the reference performance, the process of controlling the position of the sensor 20 may end (S160).

According to the above-described exemplary embodiment of the present invention, as the position setting of the sensor 20 is automatically performed, an inconvenient sensor setting process may be omitted, and the time required for sensor setting may be reduced. Furthermore, as the operation of the production line is not stopped during the sensor resetting, the productivity may be improved. In addition, as the position setting of the sensor is performed based on the measured data, the position setting of the sensor may be performed precisely and optimized, and the completeness of the quality inspection may be improved.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A sensor position control method that controls the position and angle of a sensor used for checking a bolt position alignment, comprising:

primarily measuring, by a controller, sensor performance of detecting a position of a bolt, wherein the sensor performance is measured based on data stored in a database;

in response to measuring the sensory performance, calculating, by the controller, a target position of the sensor based on data stored in the database;

in response to calculating the target position of the sensor, correcting, by the controller, the position of the sensor based the target position of the sensor by operating a position control driving unit and an angle control driving unit; and in response to correcting the position of the sensor, secondarily measuring, by the controller, the sensor performance;

comparing, by the controller, the secondarily measured sensor performance to a reference performance previously stored in the database to determine whether the secondarily measured sensor performance corresponds to the reference performance, wherein to the controller automatically corrects the position of the sensor.

2. The sensor position control method of claim 1, wherein the measuring of the recognition performance of the sensor is performed by the controller before and after the correcting of the position of the sensor.

3. The sensor position control method of claim 1, wherein based on an input request in a production line of a vehicle, the sensor position control method includes measuring, by the controller, of the recognition performance of the sensor for recognizing the position of the bolt in response to the input request.

4. The sensor position control method of claim 1, further comprising:

calculating, by the controller, the target position of the sensor again in response to the measured recognition performance of the sensor not satisfying the reference performance.

5. The sensor position control method of claim 1, further comprising:

terminating, by the controller, the sensor position control method when the measured recognition performance of the sensor satisfies the reference performance.

* * * * *